Figure 1:
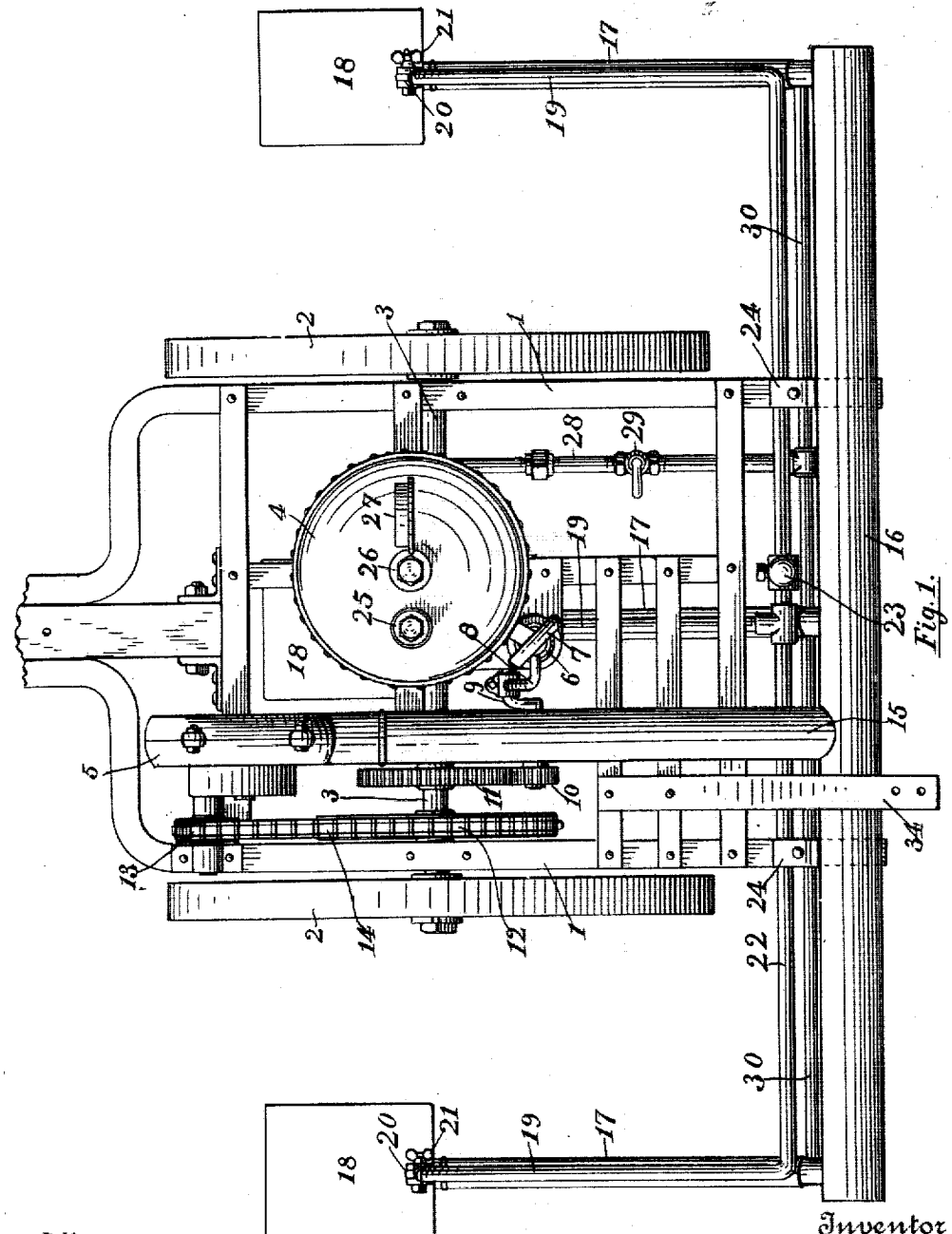

No. 827,174. PATENTED JULY 31, 1906.
J. W. PATTERSON.
SPRAYING MACHINE.
APPLICATION FILED FEB. 12, 1906.

2 SHEETS—SHEET 1.

Witnesses
Joseph C. Kirwin
Georgiana Chace

Inventor
John Wilber Patterson
By Luther V. Moulton
Attorney

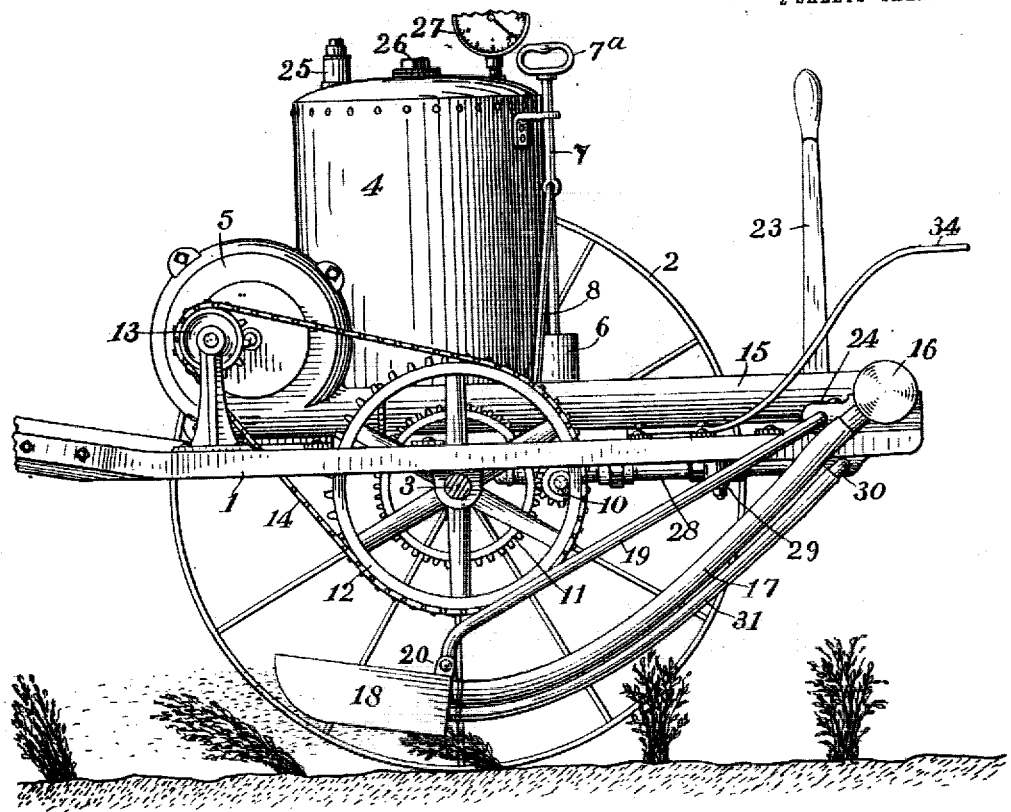
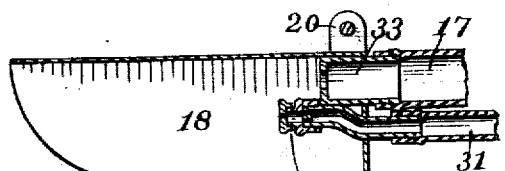
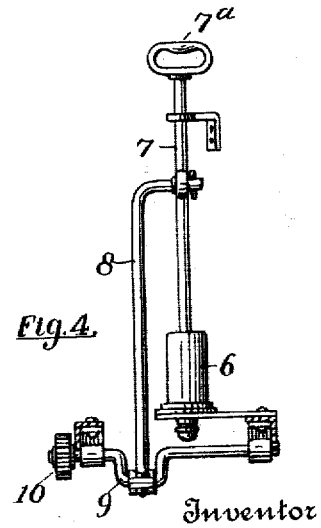

UNITED STATES PATENT OFFICE.

JOHN WILBER PATTERSON, OF REED CITY, MICHIGAN.

SPRAYING-MACHINE.

No. 827,174.　　　Specification of Letters Patent.　　　Patented July 31, 1906.

Application filed February 12, 1906. Serial No. 300,645.

*To all whom it may concern:*

Be it known that I, JOHN WILBER PATTERSON, a citizen of the United States, residing at Reed City, in the county of Osceola and State of Michigan, have invented certain new and useful Improvements in Spraying-Machines; and I do hereby declare the following to be a full, clear, and exact description of the invention, such as will enable others skilled in the art to which it appertains to make and use the same.

My invention relates to improvements in spraying-machines, and more particularly to machines for spraying potatoes and other similar plants; and its object is to provide an effective device that will apply the spray to the under side of the leaves of the plant, that will economically apply the spray without depositing the same upon the ground, and to provide the device with various new and useful features hereinafter more fully described, and particularly pointed out in the claims, reference being had to the accompanying drawings, in which—

Figure 1 is a plan view of a device embodying my invention; Fig. 2, a side elevation of the same with one wheel removed; Fig. 3, an enlarged detail, in vertical section, of the hood and spraying-nozzles; and Fig. 4, a detail of the air-pump and operating means shown in elevation.

Like numbers refer to like parts in all of the figures.

1 represents the frame of the machine, of any convenient construction and material, the same being mounted upon supporting-wheels 2, which are attached to a rotative driving-shaft 3, journaled in bearings in the frame.

4 is a tank to contain the fluid to be sprayed and air under pressure to force the fluid therefrom.

5 is a fan-blower to furnish the air-blast.

6 is an air-pump to force the air into the tank 4 and connected to the bottom thereof, whereby the air passes up through the liquid in the tank and keeps the same agitated and stirred and also forces the same out through the spraying-nozzle hereinafter described.

7 is a pump-plunger provided with a handle 7ᵃ at the top for manually operating the same. When the machine is in operation, this plunger is operated by means of a connecting-rod 8, detachably connected thereto at its upper end and to a crank-shaft 9 at its lower end, said shaft being operated by a pinion 10, mounted thereon and engaged by a gear 11 on the driving-shaft 3.

The fan-blower 5 is operated from the driving-shaft 3 by means of sprocket-wheels 12 and 13, respectively mounted on the shaft 3 and fan 5 and connected by a chain 14.

15 is an air-pipe extending from the fan 5 to a distributing-pipe 16, from whence flexible air-hose 17 extend to the air-nozzles 33, projecting within the rear and upper portion of the hoods 18. These hoods are adjustably supported upon rigid arms 19 by means of hinge-joints 20, held in adjustment by thumb-nuts 21. The arms 19 are rigidly connected to a rock-shaft 22, rotative and longitudinally slidable in bearings 24 on the frame; this shaft being manually adjustable both longitudinally and about its axis by means of a lever 23, mounted thereon.

25 represents a safety-valve to limit the pressure of air in the tank 4; 26, a removable plug, whereby the tank may be filled with the liquid to be sprayed, and 27 a gage to indicate the pressure in the tank.

28 is a pipe extending from the bottom of the tank rearward to a distributing-pipe 30 and connected thereto. 29 is a stop-cock manually adjustable to determine the flow of liquid in these pipes.

Beneath the air-nozzle 33 and within each hood 18 is a spraying-nozzle 32, connected, by means of flexible hose 31, to the distributing-pipe 30.

34 represents the usual support for a seat on which the operator rides to direct the machine and manipulate the hoods 18 and to properly guide the same above the respective rows of plants. These hoods extend above the air and spray nozzles and downward at each side thereof to limit the direction of the spray to a substantially horizontal and forward projection.

In operation the air from the fan 5 escapes from the nozzles 33 and is projected forward from beneath the hood 18 with sufficient force to turn the plants to an inclined position in the direction the machine is moving and the leaves of the plants with their under sides exposed to the spray of the liquid escaping from the nozzles 32. The spray is thus projected in substantially a horizontal direction, whereby whatever fails to strike the nearest plant will pass beyond to the next and will not fall to the ground to an appreciable extent. I am thus able to economize the liquid and to effectually apply the same the under side of the leaves, where it is most useful in destroying parasites or bugs. I am also able to manually direct the spray as it is applied and to apply such air-blast to the plants and pressure to the spraying-nozzles as to economically and effectually accomplish the work. I also provide means for readily charging the tank 4 with air-pressure by disconnecting the rod 8 and plunger 7 and manually operating the pump 6 prior to starting the machine in operation.

What I claim is—

1. In a spraying-machine in combination with means for discharging liquid in the form of spray, means for discharging a blast of air to turn the leaves of plants with their under side exposed to the spray.

2. In a spraying-machine, in combination with means for discharging a spray of liquid, a fan, means for rotating the fan, a nozzle for discharging air from the fan in the direction that the spray is discharged, and pipes for connecting the fan and nozzle.

3. The combination of a tank to contain liquid, a spraying-nozzle connected to the tank, a pump to supply air under pressure to the tank, a fan-blower, and a nozzle connected to the fan-blower to discharge a blast of air in the direction that the spray is discharged.

4. The combination of a tank to contain liquid, means for supplying air under pressure to the tank, a fan-blower, an air-nozzle and a spraying-nozzle, manually-operated means for supporting and adjusting said nozzles, and flexible pipes respectively connecting the fan and the tank with the respective nozzles.

5. The combination of a hood open at the bottom and front, an air-nozzle and a spraying-nozzle supported beneath the hood, a fan-blower connected to the air-nozzle, a tank to contain liquid and connected to the spraying-nozzle, means for supplying air under pressure to the tank, and an adjustable pivotal support for the hood.

6. The combination of a rotative and longitudinally-movable rock-shaft, a manually-operated lever attached thereto, an arm rigidly extending from the rock-shaft, a hood, an air-nozzle and a spray-nozzle supported by the said arm, a fan-blower, a flexible pipe connection between the blower and the air-nozzle, a tank, flexible pipe connections between the tank and the spraying-nozzle, means for supplying liquid to the tank means for supplying air under pressure to the tank, and means for rotating the fan.

7. The combination of a frame, a rotative axle supporting the frame, wheels attached to the axle and rotating the same, a fan-blower mounted on the frame, sprocket-wheels and chain connecting the axle and the blower, a liquid-tank mounted on the frame, an air-pump, a crank-shaft journaled on the frame, gears connecting the crank-shaft and the axle, a pitman-rod connecting the crank-shaft and pump, an air-nozzle connected to the fan, a spraying-nozzle connected to the tank, flexible pipe connections between the respective nozzles, the fan and the tank, and means for manually adjusting the nozzles.

In testimony whereof I affix my signature in presence of two witnesses.

JOHN WILBER PATTERSON.

Witnesses:
LUTHER V. MOULTON,
GEORGIANA CHACE.